(12) United States Patent
Madasu et al.

(10) Patent No.: US 11,151,454 B2
(45) Date of Patent: Oct. 19, 2021

(54) MULTI-STAGE PLACEMENT OF MATERIAL IN A WELLBORE

(71) Applicant: LANDMARK GRAPHICS CORPORATION, Houston, TX (US)

(72) Inventors: Srinath Madasu, Houston, TX (US); Keshava Prasad Rangarajan, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 16/631,429

(22) PCT Filed: Sep. 28, 2017

(86) PCT No.: PCT/US2017/053933
§ 371 (c)(1),
(2) Date: Jan. 15, 2020

(87) PCT Pub. No.: WO2019/066845
PCT Pub. Date: Apr. 4, 2019

(65) Prior Publication Data
US 2020/0210841 A1     Jul. 2, 2020

(51) Int. Cl.
*E21B 47/00* (2012.01)
*G06N 3/08* (2006.01)
*E21B 43/26* (2006.01)

(52) U.S. Cl.
CPC ............ *G06N 3/084* (2013.01); *E21B 43/26* (2013.01); *E21B 47/00* (2013.01)

(58) Field of Classification Search
CPC .... E21B 41/0092; E21B 47/00; E21B 49/008; G06N 3/02; G06N 3/08
See application file for complete search history.

(56) References Cited

U.S. PATENT DOCUMENTS

| | | |
|---|---|---|
| 2009/0182694 A1 | 7/2009 | Boulatsel et al. |
| 2011/0276187 A1 | 11/2011 | Ciglenec et al. |
| 2016/0230513 A1* | 8/2016 | Dykstra ............... E21B 33/13 |
| 2016/0305223 A1 | 10/2016 | Phillippi et al. |

(Continued)

FOREIGN PATENT DOCUMENTS

WO   2017070789 A1   5/2017

OTHER PUBLICATIONS

FR1857408, "Office Action", dated Mar. 15, 2019, 2 pages.
PCT/US2017/053933, "International Search Report and Written Opinion", dated Jun. 26, 2018, 25 pages.

*Primary Examiner* — Kenneth L Thompson
(74) *Attorney, Agent, or Firm* — Kilpatrick Townsend & Stockton LLP

(57) ABSTRACT

A system for multi-stage placement of material in a wellbore includes a recurrent neural network that can be configured based on data from a multi-stage, stimulated wellbore. A computing device in communication with a sensor and a pump is operable to implement the recurrent neural network, which may include a long short-term neural network model (LSTM). Surface data from the sensor at each observation time of a plurality of observation times is used by the recurrent neural network to produce a predicted value for a response variable at a future time, and the predicted value for the response variable is used to control a pump being used to place the material.

19 Claims, 9 Drawing Sheets

(56) References Cited

U.S. PATENT DOCUMENTS

| | | |
|---|---|---|
| 2017/0235284 A1 | 8/2017 | Watson |
| 2017/0328179 A1* | 11/2017 | Dykstra ................ E21B 49/008 |
| 2018/0010429 A1* | 1/2018 | Willberg ................ E21B 43/26 |
| 2018/0238147 A1* | 8/2018 | Shahri .................... G06F 17/18 |
| 2019/0169982 A1* | 6/2019 | Hauge .................... E21B 47/10 |
| 2019/0249542 A1* | 8/2019 | Madasu ................. E21B 43/14 |
| 2020/0208499 A1* | 7/2020 | Karale ................... E21B 43/00 |

\* cited by examiner

MULTI-STAGE PLACEMENT OF MATERIAL IN A WELLBORE

TECHNICAL FIELD

The present disclosure relates generally to devices for use in well systems. More specifically, but not by way of limitation, this disclosure relates to control of material placement during hydraulic fracturing of a wellbore.

BACKGROUND

A well system (e.g., an oil and/or gas well system) can include a wellbore drilled through a subterranean formation. The wellbore can include perforations. Fluid can be injected through the perforations to create fractures in the subterranean formation in a process referred to as hydraulic fracturing. The fractures can enable hydrocarbons to flow from the subterranean formation into the wellbore, from which the hydrocarbons can be extracted. A material known as a "diverter" can also be pumped into a well during hydraulic fracturing. A diverter accumulates in the wellbore at strategic locations in order to divert the hydraulic fracturing fluid into the portions of the wellbore where its effects can be more advantageous.

DETAILED DESCRIPTION

Figure 1:
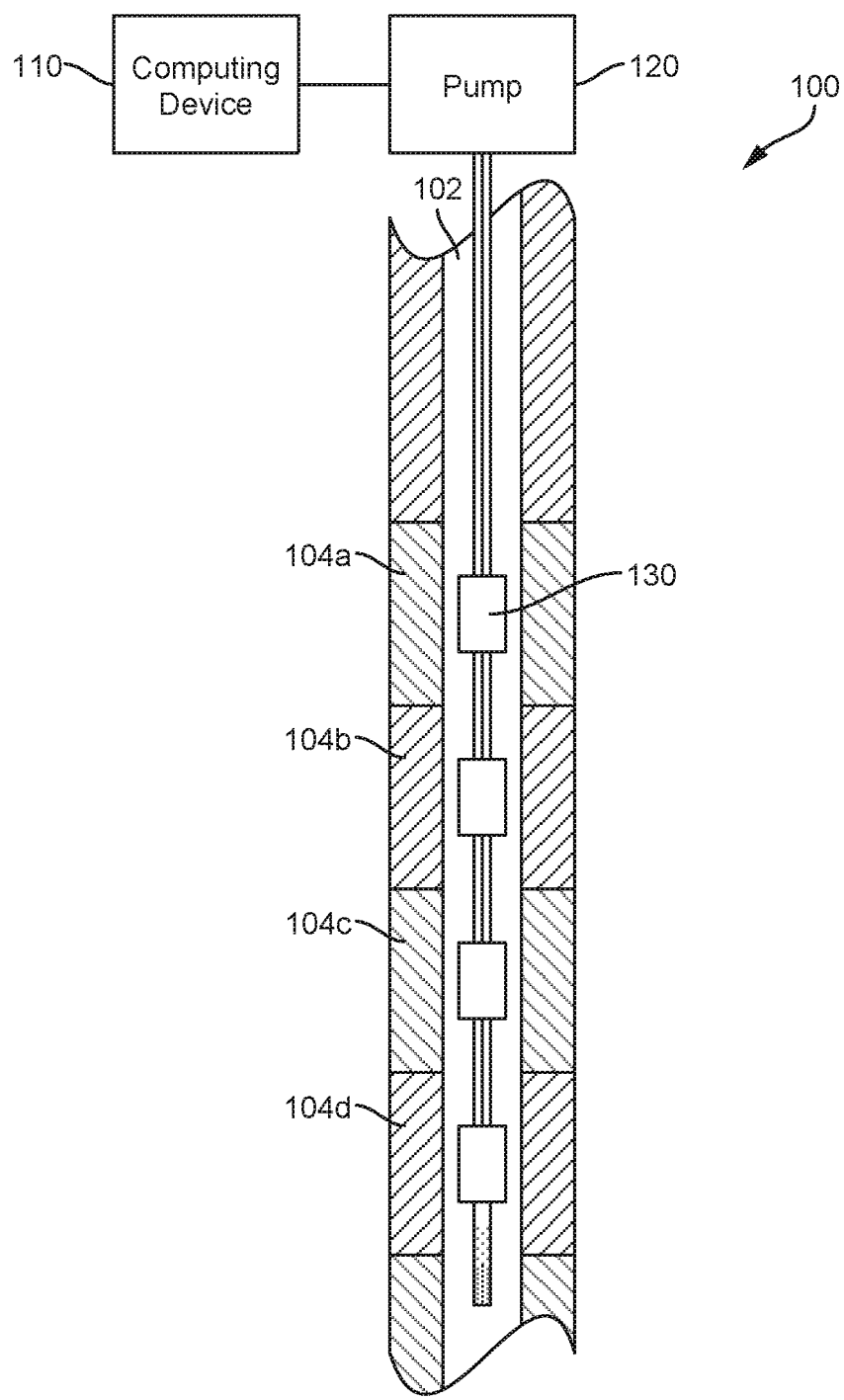
FIG. 1 is a cross-sectional view of an example of well system that includes a system for placement of material in a wellbore.

Certain aspects and features of the present disclosure relate to controlling a pump, automatically and in real-time, in response to the predicted value of a response variable to place material at each stage of a multi-stage, stimulated wellbore. The material can include, as examples, hydraulic fracturing fluid and diverter material. The response variable can be a spatially varying response variable. In some aspects, the predicted value is produced by applying a recurrent neural network to surface data received at multiple observation times. In some aspects, the recurrent neural network includes a long short-term neural network model (LSTM). The predicted value of the response variable can be one of a sequence of predicted values.

A recurrent neural network can be configured based on surface data corresponding to a stage of a multi-stage, stimulated wellbore. A computing device in communication with a sensor and a pump can implement the recurrent neural network. Surface data from the sensor at each observation time of multiple observation times can be used by the recurrent neural network to produce a predicted value for a response variable at a future time, and the predicted value for the response variable can be used to control a pump placing material at each stage of the wellbore. The response variable can be a spatially varying response variable.

In some examples, the computing device can specify a number of hidden units in an LSTM to avoid over-fitting or under-fitting the surface data. In some aspects, the computing device can organize the surface variable data at each observation time over a spatial grid to produce a time sequence of three-dimensional (3D) tensors. Each tenor can have an input and a state.

The recurrent neural network can incorporate backpropagation through time, a cross-entropy loss, a propagation over root mean squared, and early-stopping. In some examples the recurrent neural network includes an LSTM with convolutional layers. The recurrent neural network can be initialized using training data from a nearby well.

Using some examples of the present disclosure can result in real-time, prediction of a response variable related to placing material in a wellbore. A response variable can be specific to a local region of the wellbore and a specific stage of the material placement. The response variable can be predicted with high resolution and high timing accuracy. The predicted response variable can be used in real-time control of a pump so that material is placed in the wellbore with accuracy.

The model can couple real-time field data acquisition with a neural network model for making real-time decisions. The model can be fast and can be used in real time. The model can account for temporal and spatial changes along the wellbore. The model can be accurate, stable, and robust. The model can predict the critical response variables, such as a pressure response, accurately and quickly in real time to enable quick decisions. Using a recurrent neural network can overcome the difficulty dealing directly with complicated non-linear physics, and can provide a robust, stable, and accurate numerical solution throughout the pumping stages when placing material in a wellbore. The pumping stage predictions can be quantified accurately to control the pump.

Illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a partial cross-sectional diagram of a well 100 having layers 104a, 104b, 104c, and 104d in a production zone. The layers 104a-d can be adjacent portions of a subterranean formation through which a wellbore 102 is formed. The layers 104a-d can each have a different composition and a different amount of blockage therein resulting in different permeabilities. Each layer may be treated differently with respect to material placement, and to that extent, a material placement process for well 100 may be said to be a "multi-stage" process in that each time a change in fracturing characteristics occurs during material placement due to the multiple layers, another stage in the material placement process can be reached. The well 100 can also include a computing device 110, a pump 120, and sensors 130.

The computing device 110 can dynamically optimize a pumping schedule for material placed in well 100, such as for stimulating the well 100. The computing device 110 can determine the specific pressure and the specific pump rate of a fluid to pump into the wellbore 102. The computing device 110 can record surface data including values of variables that can serve as inputs to a model that is applied to the surface data at various observation times to predict a value of a response variable at a future time. The computing device 110 can control pump 120 using this prediction.

In some examples, the computing device 110 can be used to control the placement of a diverter. A diverter can be a fluid (e.g., polylactic acid) for temporarily reducing permeability in a layer. The diverter material injected into the subsurface formation may be, for example, a degradable polymer. Examples of different degradable polymer materials that may be used include, but are not limited to, polysaccharides; lignosulfonates; chitins; chitosans; proteins; proteinous materials; fatty alcohols; fatty esters; fatty acid salts; aliphatic polyesters; poly(lactides); poly(glycolides); poly($\varepsilon$-caprolactones); polyoxymethylene; polyurethanes; poly(hydroxybutyrates); poly(anhydrides); aliphatic polycarbonates; polyvinyl polymers; acrylic-based polymers; poly(amino acids); poly(aspartic acid); poly(alkylene oxides); poly(ethylene oxides); polyphosphazenes; poly(orthoesters); poly(hydroxy ester ethers); polyether esters; polyester amides; polyamides; polyhydroxyalkanoates; polyethyleneterephthalates; polybutyleneterephthalates; polyethylenenaphthalenates, and copolymers, blends, derivatives, or combinations thereof. However, it should be appreciated that embodiments of the present disclosure are not intended to be limited thereto and that other types of diverter materials may also be used. At certain stage, the amount of diverter placed in the wellbore may be greater than or less than at other stages. In some examples, the computing device 110 can be used to similarly control the placement of hydraulic fracturing fluid. In additional or alternative examples, the computing device 110 can optimize the pumping schedule so that less time is needed or less material is needed to achieve a desired result.

In some aspects, the pump 120 can be positioned at the surface of the well 100 for pumping a fluid into the wellbore 102. The pump 120 can be communicatively coupled to the computing device 110 for receiving instructions from the computing device 110. In additional or alternative aspects, the well 100 can include one or more pumps.

The sensors 130 can be positioned in the wellbore 102 for measuring average pressures and flow rates at each stage, and communicating this data to the surface. The term "surface data" as used herein can include data communicated to the surface by sensors 130 as well as other data determined from the pump or other surface equipment. The well 100 can include a multilateral wellbore having any number of lateral bores, each passing through any number of layers. In some examples, the wellbore can include a cement casing. The wellbore can be in any phase, including installation, completion, stimulation, and production. In some aspects, a wellbore can have a single sensor.

Figure 2:
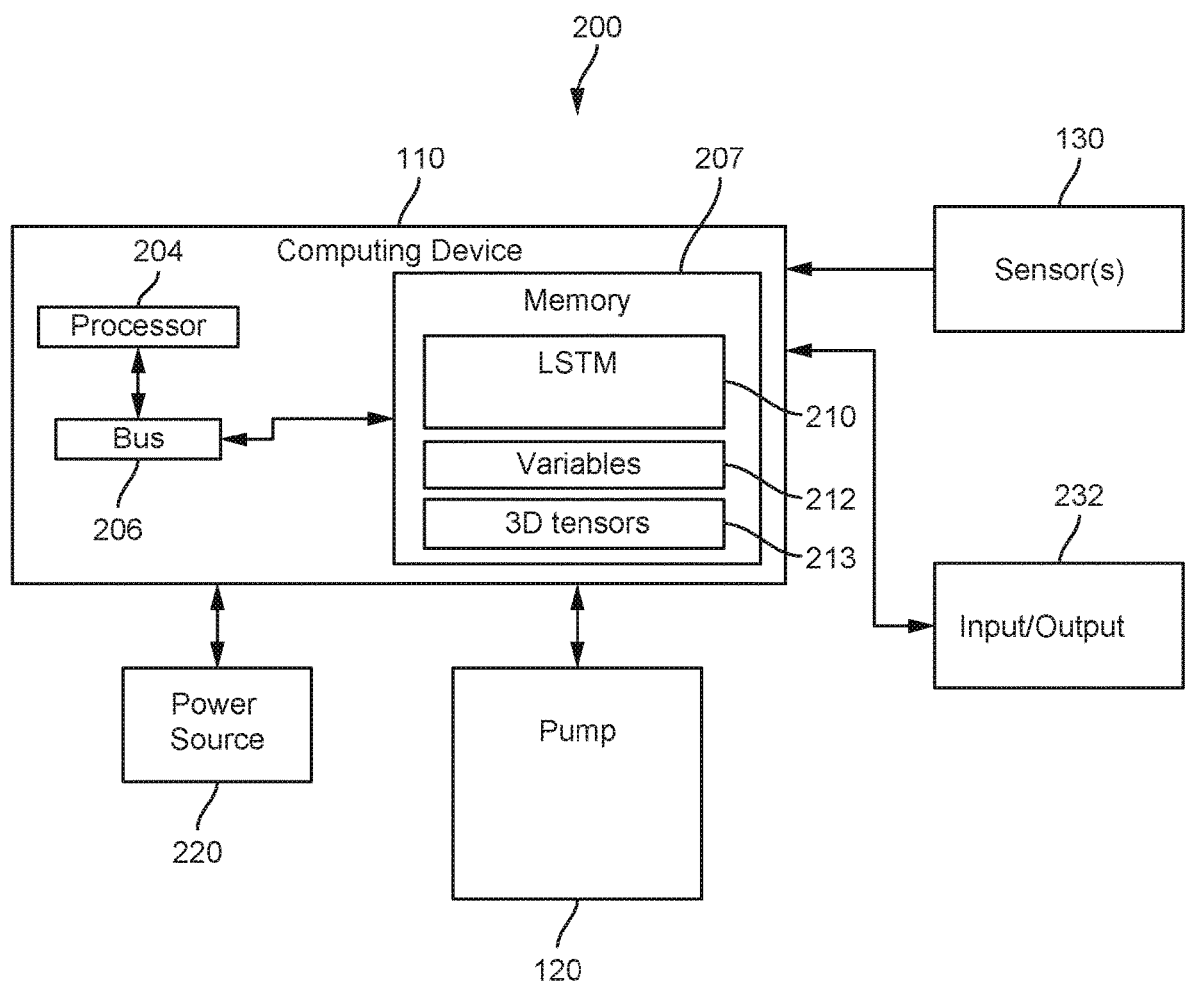
FIG. 2 is a schematic diagram of a system for placing material in a wellbore according to some aspects.

FIG. 2 is a block diagram of an example of a system 200 for controlling a pump over time according to some aspects. In some examples, the components shown in FIG. 2 (e.g., the computing device 110 and power source 220 can be integrated into a single structure. For example, the components can be within a single housing. In other examples, the components shown in FIG. 2 can be distributed (e.g., in separate housings) and in electrical communication with each other.

The system 200 includes a computing device 110. The computing device 110 can include a processor 204, a memory 207, and a bus 206. The processor 204 can execute one or more operations for obtaining data associated with the wellbore and controlling a pump to place material into the wellbore. The processor 204 can execute instructions stored in the memory 207 to perform the operations. The processor 204 can include one processing device or multiple processing devices. Non-limiting examples of the processor 204 include a Field-Programmable Gate Array ("FPGA"), an application-specific integrated circuit ("ASIC"), a microprocessor, etc.

The processor 204 can be communicatively coupled to the memory 207 via the bus 206. The non-volatile memory 207 may include any type of memory device that retains stored information when powered off. Non-limiting examples of the memory 207 include electrically erasable and programmable read-only memory ("EEPROM"), flash memory, or any other type of non-volatile memory. In some examples, at least some of the memory 207 can include a non-transitory medium from which the processor 204 can read instructions. A non-transitory computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 207 can include computer program instructions 210 for executing an LSTM according to some aspects. The instructions 210 can be usable for applying the LSTM to surface data associated with the wellbore and controlling the pump in response to a predicted value of a response variable. In some examples, the memory 207 can include stored variable values 212 and stored 3D tensors 213.

The system 200 can include a power source 220. The power source 220 can be in electrical communication with the computing device 110. In some examples, the power source 220 can include a battery or an electrical cable (e.g., a wireline). In some examples, the power source 220 can include an AC signal generator. System 200 receives input from sensor(s) 130, which were shown FIG. 1. System 200 in this example also includes input/output interface 232. Input/output interface 232 can connect to a keyboard, pointing device, display, and other computer input/output devices. An operator may provide input using the input/output interface 232. All or portions of input/output interface 232 may be located either locally or remotely relative to the rest of system 200.

During a stage of the stimulation process for a stimulated well, fluids are inserted at the top of the wellhead, while the flow is driven by the difference between the dynamic pressure and reservoir pressure. This pressure difference is driven by a pump. The physics and engineering aspects that are involved are complex and data can sometimes be uncertain and noisy. The use of an recurrent neural network as described herein can resolve time and spatial non-linear variations. The recurrent neural network can predict a response variable in a job based on known surface variables.

The average pressure, average flow rate, proppant concentration etc. variation with the various stages can be known from the surface pumping data. The prediction of a response variable such as pressure response can assist in controlling a pump for various processes where material is pumped into a wellbore, including hydraulic fracturing and matrix acidizing.

Figure 3:
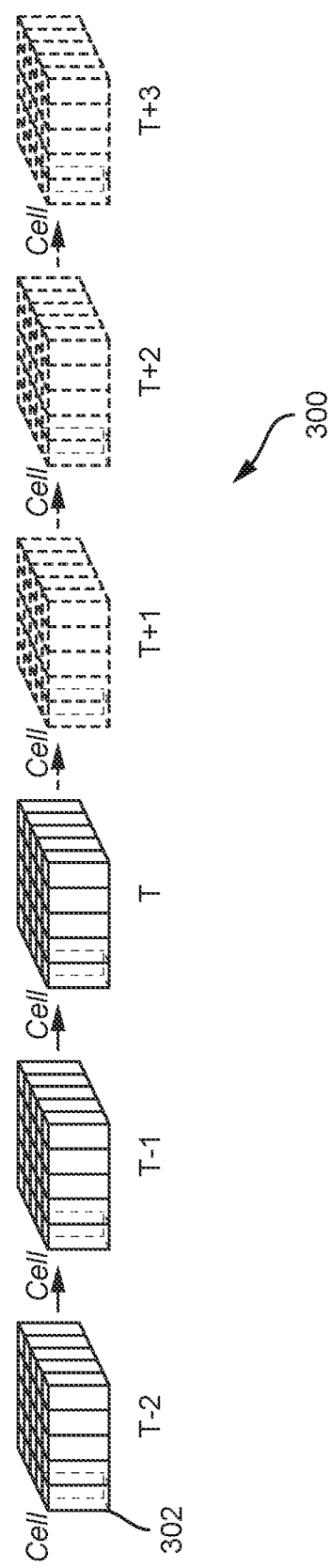
FIG. 3 is a schematic illustration of the organizing of data that can be used in a system for placement of material in a wellbore.

To use the spatio-temporal correlations present in the surface data, the data can be organized as a series of 3D tensors over time. FIG. 3 illustrates the surface data presented as a sequence of tensors 300. The tensor at time T represents the current observation. Each tensor includes a number of cells, such as cell 302 of the tensor for time T−2, two observations prior to the current observation. The tensor for time T−1 represents the observation immediately before the current observation. The cells define an M×xN grid as the sequence of tensors. The tensors at times T+1, T+2, and T+3 represent future times corresponding to predicted values of the response variable. The 3D tensor cells can enable prediction of the most likely length-K sequence in the future given the previous J observations according to:

$$\tilde{X}_{t+1}, ...,$$

$$\tilde{X}_{t+K} = \underset{x_{t+1}, ..., x_{t+K}}{\mathrm{argmax}}\, p\Big(X_{t+1}, ..., X_{t+K} \,\Big|\, \hat{X}_{t-j+1}, ..., \hat{X}_{t-j+2}, ..., \hat{X}_t\Big)$$

Figure 4:
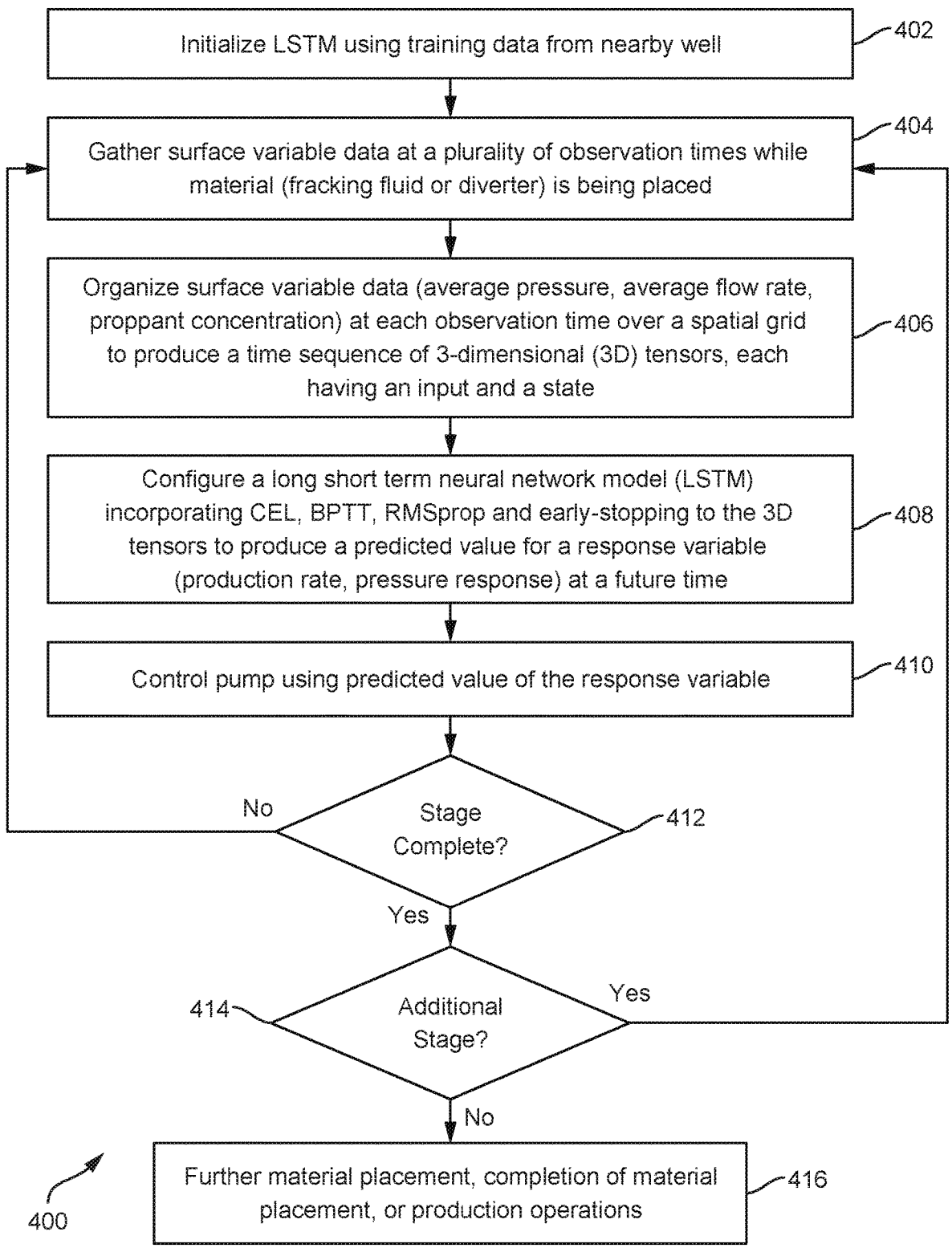
FIG. 4 is an example of a flowchart of a process for placing material in a wellbore according to some aspects.

FIG. 4 is an example of a flowchart of a process 400 for real-time, multi-stage placement of material in a wellbore. Some examples can include more, fewer, or different blocks than those shown in FIG. 4. The blocks shown in FIG. 4 can be implemented using, for example, the computing device illustrated in FIG. 1 and FIG. 2.

At block 402 of FIG. 4, an LSTM is initialized using training data from a nearby well. At block 404, surface data is gathered at each of multiple observation times while material is being placed in a wellbore. The surface data define values for input variables for the LSTM, thus, the surface data may be referred to herein as "surface variable data." The term "surface" data as used herein describes data collected at the surface of a wellbore. The data can be collected with the aid of sensors in the wellbore, such as sensors 130 of FIG. 1 and FIG. 2, and therefore can reflect conditions within the wellbore. In some examples surface variable data includes data gathered from surface equipment.

In this example, surface data includes average pressure and average flow rate. Surface data can include other variables depending on material being placed. For example, if fracturing fluid is being placed, the surface data includes proppant concentration. If diverter is being placed, surface data also includes diverter presence if fracturing fluid is being placed, along with diverter mass by stage.

Still referring to FIG. 4, at block 406, the surface data at each observation time is organized over a spatial grid to produce a time sequence of 3-dimensional (3D) tensors, each having an input and a state. At block 408, the surface data as represented by the tensors is used to configure the LSTM with the surface data to produce a predicted value for a response variable. In this example, the LSTM includes incorporates backpropagation through time (BPTT), cross-entropy loss (CEL), propagation over root mean squared (RMSProp), and early-stopping. The LSTM is re-trained at each time interval using the real-time surface data. A value or values for a response variable such as production rate or pressure response at a future time is produced. At block 410 the pump is controlled using the predicted values of the response variable.

At block 412 of FIG. 4, if the placement for the current stage is not compete, the process of gathering surface data, configuring the LSTM, and controlling the pump repeats. Otherwise, if placement for the current stage is complete, a determination is made at block 414 as to whether there is an additional stage for material placement in the wellbore. If so, the process of gathering surface data, configuring the LSTM, and controlling the pump continues with the next stage of the wellbore. Otherwise, at block 416, the process completes, further material placement takes place, possibly using a technique different than that discussed above, or production operations commence.

Figure 5:
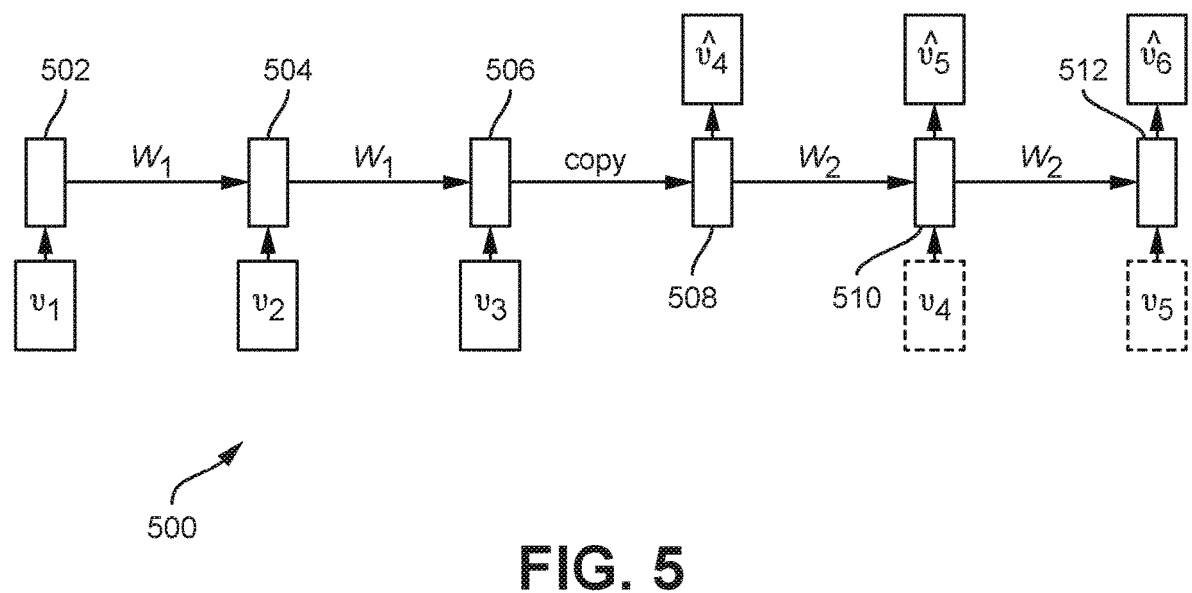
FIG. 5 is a graphical illustration of a model that can be used in a system for placement of material in a wellbore according to some aspects.

FIG. 5 is a graphical illustration of an example of an LSTM 500 that can be used to control the placement of material in a wellbore. LSTM 500 does not make use of convolutional layers. The model can provide for a multi-step prediction method for spatio-temporal data provided by the 3D tensors discussed with respect to FIG. 3. LSTM 500 can provide a network structure for spatiotemporal data that accounts for the spatiotemporal characteristics of the data by providing strong correlation between local neighbors. The structure of the LSTM is configured by the surface data to form a structure based on state-to-state transitions. The network is regularized by specifying a number of hidden units in the LSTM to avoid over-fitting or under-fitting the surface data. Over-fitting of the data occurs when a model fits the data almost perfectly and the model is complicated. This typically means the model is fitting the noise of the data. The model has low bias and high variance. On the contrary, under-fitting occurs when the model is too simple to fit the data hence it has high bias and low variance. The predictive model should balance between over-fitting and under-fitting the data. This can be determined by the performance of the model on the training and test data. Input and state at a time/sequence-stamp are given by the 3D tensors:

$$i_t = \sigma(W_{xi} * X_t + W_{hi} * \mathcal{H}_{t-1} + W_{ci} \circ C_{t-1} + b_i)$$

$$f_t = \sigma(W_{xf} * X_t + W_{hf} * \mathcal{H}_{t-1} + W_{cf} \circ C_{t-1} + b_f)$$

$$C_t = f_t \circ C_{t-1} + i_t \circ \tanh(W_{xc} * X_t + W_{hx} * \mathcal{H}_{t-1} + b_c)$$

$$o_t = \sigma(W_{xo} * X_t + W_{ho} * \mathcal{H}_{t-1} + W_{co} \circ C_t + b_o)$$

$$\mathcal{H}_t = o_t \circ \tanh(C_t)$$

Still referring to FIG. 5, the network at each of points 502, 504, and 506 can be a learned representation that accounts for the characteristics of the wellbore as related to material placement in accordance with the above equations. The network at future points in time 508, 510, and 512 is a predicted representation that takes into account these characteristics.

Figure 6:
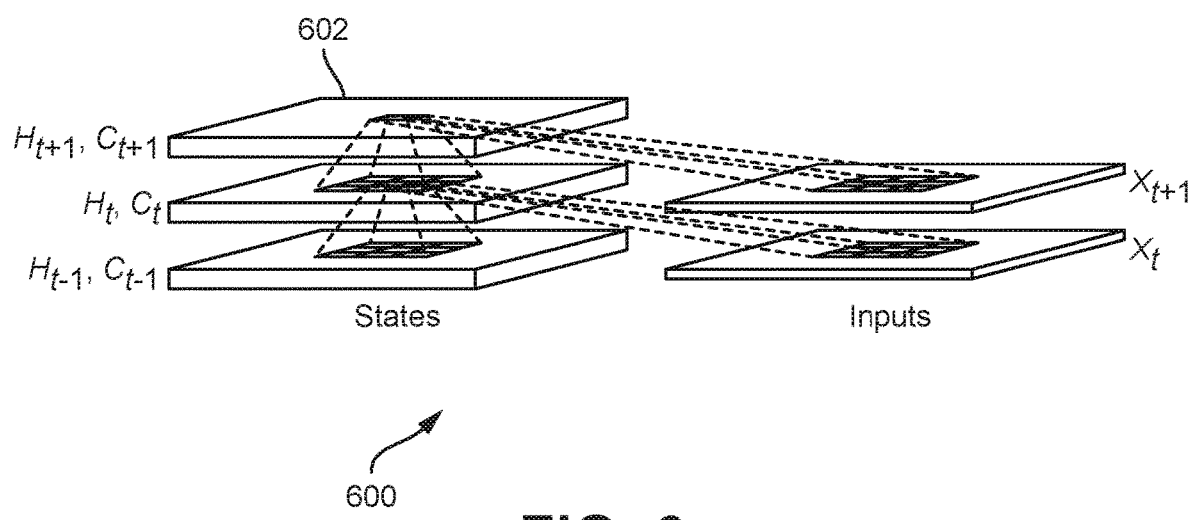
FIG. 6 is a graphical illustration of another model that can be used in a system for placement of material in a wellbore according to some aspects.
Figure 7:
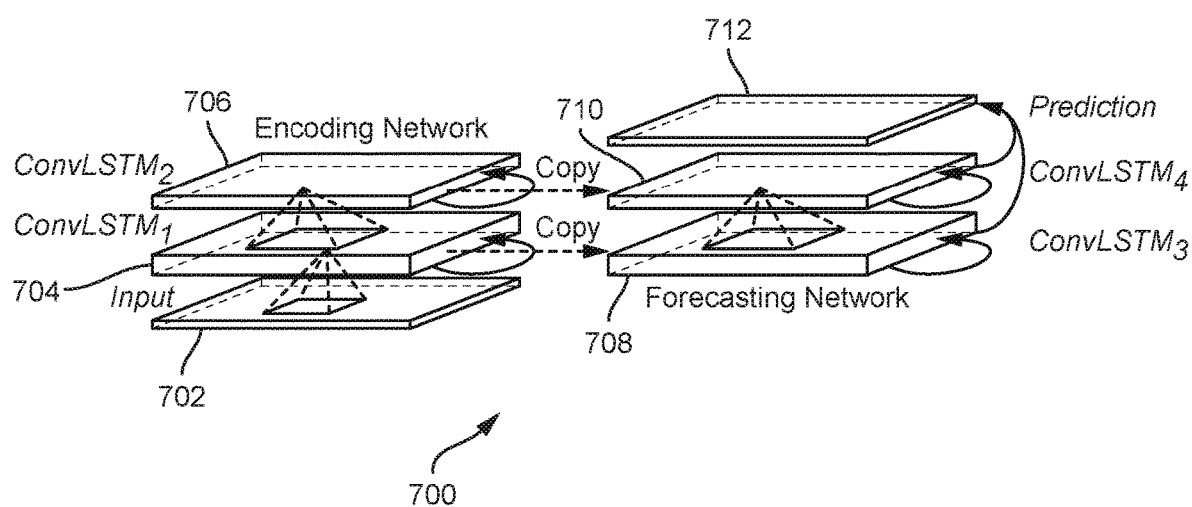
FIG. 7 is a further graphical illustration of the model of FIG. 6 being used in the system for placement of material in a wellbore according to some aspects.

FIG. 6 is a graphical illustration of an LSTM network 600 with convolutional layers that follows the equations given above. Convolutions are used for both input-to-state and state-to-state connections. Using convolutional layers, the final state, represented by layer 602, will have a large receptive field. FIG. 7 shows how convolutional layers 700 are used to predict stimulated wellbore properties. An input 702 is used in an encoding network including layers 704 and 706. A forecasting network configured with the real-time surface data and including convolutional layers 708 and 710 produces a prediction, 712.

Figure 8:
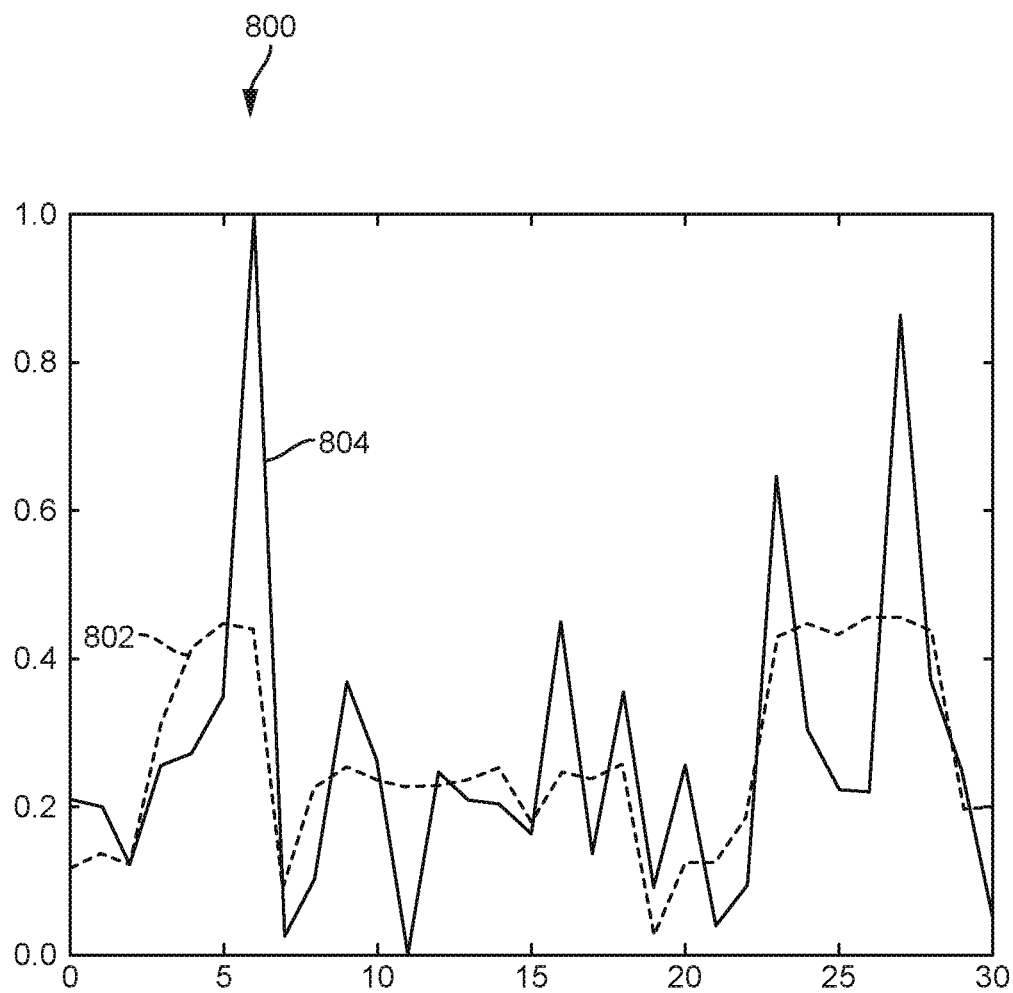
FIG. 8 is a graph showing results of using the model for placement of material in a wellbore according to some aspects.
Figure 9:
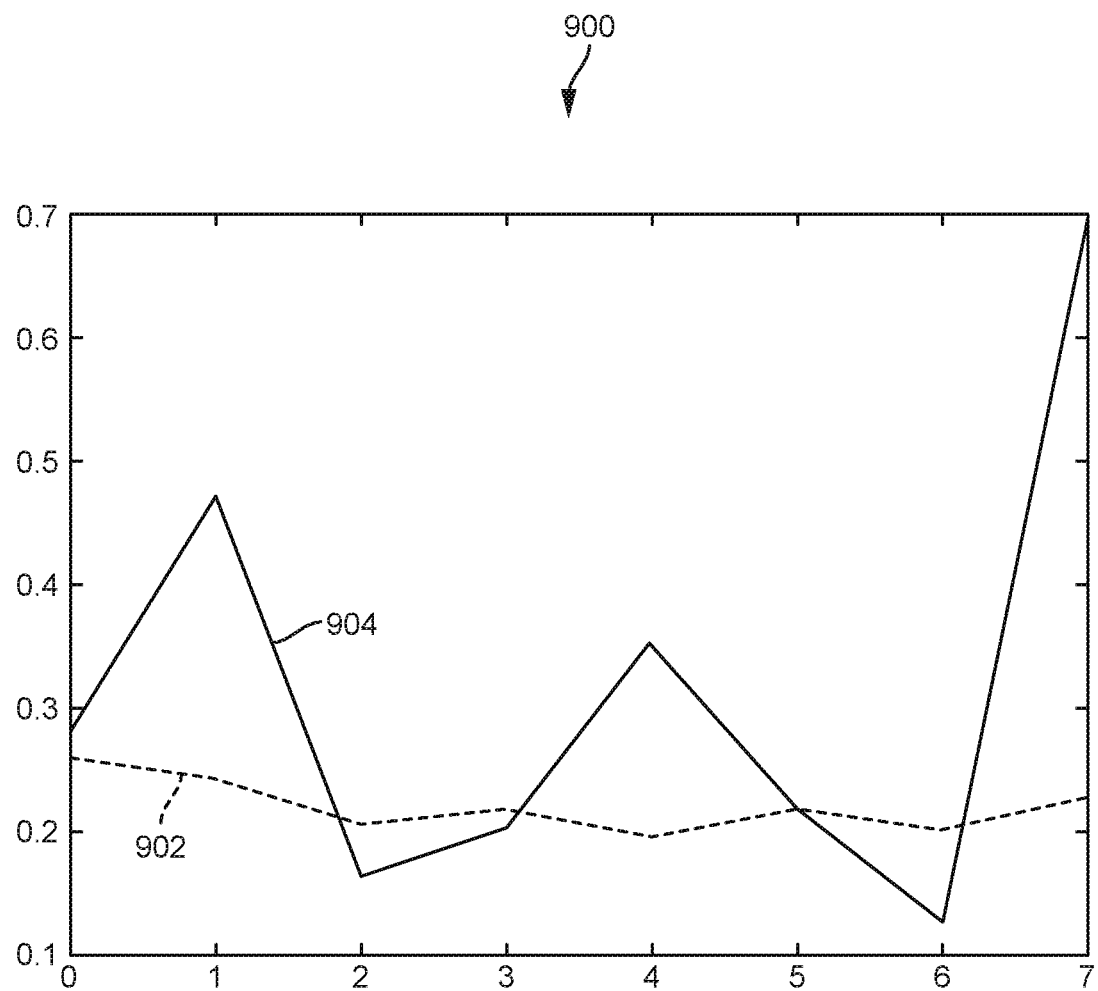
FIG. 9 is a graph showing additional results of using the model for placement of material in a wellbore according to some aspects.

FIG. 8 and FIG. 9 are graphs illustrating the prediction of a response variable using an LSTM as described herein. FIG. 8 is a graph 800 comparing predicted values of a response value shown by curve 802 with actual values of the response variable as shown by curve 804 using normalized initial training data. FIG. 9 is a graph 900 comparing predicted values of a response value as shown by curve 902 with actual values of the response variable as shown by curve 904 using normalized real surface data.

In some aspects, systems, devices, and methods for multi-stage placement of material in a wellbore are provided according to one or more of the following examples:

Example #1: A method can include receiving surface data at a plurality of observation times corresponding to a stage of a multi-stage, stimulated wellbore while material is being pumped into the multi-stage, stimulated wellbore, and at each observation time of the plurality of observation times, configuring a recurrent neural network using the surface data to produce a predicted value for a response variable. The method can further include controlling a pump using the predicted value of the response variable to place the material at the stage of the multi-stage, stimulated wellbore.

Example #2: The method of Example #1 may feature the recurrent neural network comprising a long short-term neural network model (LSTM).

Example #3: The method of any of Examples #1-2 may feature specifying a number of hidden units in the recurrent neural network to avoid over-fitting or under-fitting the surface data.

Example #4: The method of any of Examples #1-3 may feature the LSTM incorporating at least one of backpropagation through time, cross-entropy loss, propagation over root mean squared, or early-stopping.

Example #5: The method of any of Examples #1-4 may feature an LSTM comprising convolutional layers.

Example #6: The method of any of Examples #1-5 may feature organizing the surface data at each observation time over a spatial grid to produce a time sequence of 3-dimensional (3D) tensors, each having an input and a state.

Example #7: The method of any of Examples #1-6 may feature receiving training data from a nearby well and initializing the recurrent neural network using the training data.

Example #8: A non-transitory computer-readable medium that includes instructions that are executable by a processing device for causing the processing device to perform operations according to any of Examples #1-7.

Example #9: A system can include a pump in operable communication with a multi-stage, stimulated wellbore. The system may also include a sensor disposed within a stage of the multi-stage, stimulated wellbore. The system may also include a computing device in communication with the pump and the sensor. The computing device may be operable to receive surface data from the sensor and configure a recurrent neural network based on the surface data at each observation time of a plurality of observation times to produce a predicted value for a response variable at a future time. The computing device may be operable to control the pump using the predicted value of the response variable.

Example #10: The system of Example #9 may feature a recurrent neural network that includes a long short-term neural network model (LSTM).

Example #11: The system of Examples #9-10 may feature specifying a number of hidden units in the recurrent neural network to avoid over-fitting or under-fitting the surface data.

Example #12: The system of any of Examples #9-11 may feature the recurrent neural network incorporating at least one of backpropagation through time, a cross-entropy loss, a propagation over root mean squared, or early-stopping.

Example #13: The system of any of Examples #9-12 may feature an LSTM including convolutional layers.

Example #14: The system of any of Examples #9-13 may feature organizing the surface data at each observation time over a spatial grid to produce a time sequence of 3-dimensional (3D) tensors, each having an input and a state.

Example #15: The system of any of Examples #9-14 may feature initializing the recurrent neural network using training data from a nearby well.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
  a pump in operable communication with a multi-stage, stimulated wellbore;
  a sensor disposed within a stage of the multi-stage, stimulated wellbore; and
  a computing device in communication with the pump and the sensor, the computing device being operable to:
    receive surface data from the sensor;
    organize the surface data at each observation time over a spatial grid to produce a time sequence of 3-dimensional (3D) tensors, each having an input and a state;
    configure a recurrent neural network based on the surface data at each observation time of a plurality of observation times to produce a predicted value for a response variable at a future time; and
    control the pump using the predicted value of the response variable.

2. The system of claim 1 wherein the recurrent neural network comprises a long short-term memory neural network model (LSTM) and the computing device is further operable to specify a number of hidden units in the LSTM to avoid over-fitting or under-fitting the surface data.

3. The system of claim 1 wherein the recurrent neural network incorporates backpropagation through time, a cross-entropy loss, a propagation over root mean squared, and early-stopping.

4. The system of claim 1 wherein the recurrent neural network comprises a long short-term memory neural network model (LSTM) including convolutional layers.

5. The system of claim 1 wherein the computing device is further operable to initialize the recurrent neural network using training data from a nearby well.

6. The system of claim 1 wherein the operation of controlling the pump comprises controlling an application of a diverter fluid within the multi-stage, stimulated wellbore.

7. The system of claim 1 wherein the operation of controlling the pump comprises controlling a matrix acidizing operation within the multi-stage, stimulated wellbore.

8. A method comprising:
  receiving surface data at a plurality of observation times corresponding to a stage of a multi-stage, stimulated wellbore while material is being pumped into the multi-stage, stimulated wellbore;

organizing the surface data at each observation time over a spatial grid to produce a time sequence of 3-dimensional (3D) tensors, each having an input and a state;

at each observation time of the plurality of observation times, configuring a recurrent neural network using the surface data to produce a predicted value for a response variable; and controlling a pump using the predicted value of the response variable to place the material at the stage of the multi-stage, stimulated wellbore.

9. The method of claim 8 wherein the recurrent neural network comprises a long short-term neural network model (LSTM).

10. The method of claim 9 further comprising specifying a number of hidden units in the LSTM to avoid over-fitting or under-fitting the surface data.

11. The method of claim 9 wherein the LSTM incorporates backpropagation through time, cross-entropy loss, propagation over root mean squared, and early-stopping.

12. The method of claim 9 wherein the LSTM comprises convolutional layers.

13. The method of claim 9 further comprising:
receiving training data from a nearby well; and
initializing the LSTM using the training data.

14. A non-transitory computer-readable medium that includes instructions that are executable by a processing device for causing the processing device to perform operations comprising:

receiving surface data at a plurality of observation times corresponding to a stage of a multi-stage, stimulated wellbore while material is being pumped into the multi-stage, stimulated wellbore;

organizing the surface data at each observation time over a spatial grid to produce a time sequence of 3-dimensional (3D) tensors, each having an input and a state;

at each observation time of the plurality of observation times, configuring a recurrent neural network using the surface data to produce a predicted value for a response variable; and controlling a pump using the predicted value of the response variable to place the material at the stage of the multi-stage, stimulated wellbore.

15. The non-transitory computer-readable medium of claim 14 wherein recurrent neural network comprises a long short-term neural network model (LSTM).

16. The non-transitory computer-readable medium of claim 15 wherein the operations further comprise specifying a number of hidden units in the LSTM to avoid over-fitting or under-fitting the surface data.

17. The non-transitory computer-readable medium of claim 15 wherein the LSTM incorporates backpropagation through time, cross-entropy loss, propagation over root mean squared, and early-stopping.

18. The non-transitory computer-readable medium of claim 15 wherein the LSTM comprises convolutional layers.

19. The non-transitory computer-readable medium of claim 15 wherein the operations further comprise:
receiving training data from a nearby well; and
initializing the LSTM using the training data.

* * * * *